Patented June 13, 1950

2,510,994

UNITED STATES PATENT OFFICE 2,510,994

HYDROCARBON CONVERSION WITH THE USE OF A PRECIPITATED AND CALCINED BERYLLIUM OXIDE CATALYST

George Alexander Mills, Swarthmore, Pa., assignor to Houdry Process Corporation, Wilmington, Del., a corporation of Delaware No Drawing. Application December 26, 1947, Serial No. 794,099

4 Claims. (Cl. 196—52)

The present invention relates to catalytic cracking of hydrocarbons and is chiefly concerned with improvements in such processes by the use of novel catalysts therein.

Although other types of compositions have been suggested in the patent art and literature as cracking catalysts, those giving cracked products of required quality in high or acceptable yields, such as normally liquid hydrocarbons particularly in the boiling range of gasoline, are essentially siliceous. Among these known siliceous catalysts are included natural hydrosilicates of aluminum such as certain processed clays, and synthetic gels comprising silica and another metal oxide such as alumina.

In accordance with the present invention hydrocarbon materials are cracked in contact with a catalyst consisting essentially of a single component, beryllium oxide.

I have found that beryllium oxide is remarkably stable to high concentrations of steam at elevated temperatures, as compared to the behavior of siliceous cracking catalysts. Because of the demonstrated stability against steam deactivation, these beryllia catalysts employed in accordance with the invention are particularly important in cracking of such high boiling stocks to which steam is added in assisting vaporization of the charge. Besides steam intentionally added to a charge stock for this or other purposes, a catalyst in use in hydrocarbon cracking operations is normally brought into contact with steam at elevated temperatures, such as steam that may be employed in purging of the catalyst or steam formed in the processes of hydrocarbon conversion and periodic regeneration of the catalyst by burning of the carbonaceous deposit formed therein. By providing a catalyst more stable against deactivation by the steam thus encountered, the catalyst is maintained at higher activity levels over repeated cycles of operation and higher yields of desired conversion products can thus be obtained. This factor prolongs the total and useful life of the catalyst before replacement thereof is required, and provides important advantages in the over-all economics of the hydrocarbon processing operation.

The catalysts of the invention can be readily prepared by a procedure involving simple precipitation of a hydroxide or hydrous oxide of beryllium from a soluble salt thereof. For instance an aqueous solution of a beryllium sulfate treated with ammonia results in the formation of a gelatinous precipitate of hydrous beryllium hydroxide, from which the oxide used as catalyst can be obtained by drying and calcination.

It is believed that the precipitate freshly formed is a gel for the most part particularly if precipitation is effected in the cold, but the possibility is not excluded that even this freshly formed precipitate may be composed of minute crystals. The pH conditions under which precipitation of the beryllia or the corresponding hydroxide takes place are influenced by the concentration of the product in the liquid reaction medium, since the fresh gel is soluble in acidic or alkaline media. Precipitation can be readily effected from even quite dilute solutions (as of the order 3 to 5 grams BeO per liter of reaction mass) under neutral to slightly alkaline conditions preferably at a pH of about pH 8–9. With higher product concentration a wider precipitation range is available as from about pH 5 to 10.

The precipitated gel is purified and washed substantially free of soluble impurities, and may be also treated with base exchange solutions to remove alkali metal ions. The purification may be carried out on the wet gel after removal of the major part of the extraneous water as by filtration or the gel may be previously dried prior to such washing operations. For use in certain catalytic cracking systems, the beryllium oxide may be formed as pellets, granules, or other discrete pieces in any known or desired manner. For instance, the washed or unwashed product may be filtered and partially dried to form a cake which can be broken up into lumps of suitable size, or the product may be cast or extruded into pieces of desired size and shape with adjustment of the water contents as required for the particular forming operation.

Although calcination of the catalyst can be effected incident to the high temperatures encountered during its use in cracking of hydrocarbons and in periodic regeneration, it is preferred to calcine the catalyst prior to its being charged into the hydrocarbon conversion system. Such calcination may be accomplished by subjecting the catalyst to temperatures above about 800° F. in air or other non-reactive gases alone or in an admixture with steam, or in steam alone.

In the use of the catalysts of the present invention the usual conditions of cracking can be availed of without modification, the catalyst being in the form of fine particles, granules, globules, pellets or the like. The described catalyst can be employed in fixed bed processes for cracking of petroleum fractions as well as in processes in which the catalyst moves through the reaction zone. As an example of a fixed bed operation, cracking may be carried out at a temperature of 800–900° F., employing a space rate (volume of charge liquid basis per volume of catalyst per hour) of about 1.5 and a pressure of about 15 pounds per square inch gauge. The temperature, of course, may be varied within the range of about 700 to 1100° F., the space rate within the range of about 0.5 to 8 and pressures may be employed from about atmospheric or slightly lower up to about 100 pounds per square inch or higher. Under these conditions the operating period "on stream" may range from five to sixty minutes, for example 10 to 30 minutes alternating with regeneration periods. In commercial operation, temperatures above 750° F. are preferred. Steam may be added to the charge stock and is particularly advantageous in assisting the vaporization of heavier stocks.

In processes other than the fixed bed, such as where the catalyst moves or is moved through the reaction zone, the conditions employed may be such as to subject the oil to substantially equivalent conditions including contact time and ratios of oil to catalyst as those set out above in connection with the fixed bed process.

Whereas in the fixed bed operation the catalyst is alternately subjected to regeneration, in other processes the catalyst is passed during its cycle through a separate regeneration zone. In all of these processes regeneration is effected by contacting the catalyst after use, with air or other oxygen-containing gas to burn off carbonaceous deposit.

Because of the relatively low apparent density of the catalysts of the invention, these are of particular advantage for use in systems wherein the catalyst is transported by a fluid carrier medium, since the power output required for the purpose is materially reduced. On the other hand, beryllia displays a comparatively high specific heat which can be availed of in maintaining temperature control in the operations of hydrocarbon conversion and catalyst regeneration.

*Example*

A substantially pure beryllium oxide catalyst was prepared by adding to 20 volumes of an aqueous solution of beryllium sulfate containing 3.54 grams $BeSO_4 \cdot 4H_2O$ per liter, 6.5 volumes of ammonium hydroxide solution (28% $NH_3$). The batch was heated to 57° C. while stirring and a gelatinous precipitate was obtained of 8.5 pH.

The precipitate was filtered on a ceramic filter and washed with water, then centrifuged. The obtained cake was broken into lumps and dried in an oven at 200° F. The dried product was then ground in a ball-mill and cast with addition of water into 4 mm. pellets.

A portion of the obtained pellets was calcined in air at 1050° F. for 2 hours and employed in cracking of a light gas oil at a temperature of approximately 800° F. during a 10 minute on stream period alternated with regeneration, employing atmospheric pressure, and a liquid space rate of 1.5 (volume of charge catalyst per hour). There was obtained an average yield of 36.2% gasoline (410° F. cut point) per volume of charge with the formation of 2.9% by weight coke and 9.4% by weight gas of 1.59 specific gravity.

Another portion of the pellets above obtained were treated with 100% steam at 1350° F. for 4 hours, and thereafter employed in cracking the same light gas oil under substantially the same conditions, resulting in a yield of 31.7% by volume gasoline and the production of 1.9% by weight coke, 6.4% by weight gas of 1.56% specific gravity.

The air treated pellets above had an apparent bulk density of 0.37 and the steam-treated pellets 0.36 (measured as the weight in kilograms of a liter of packed pellets).

Obviously many modifications and variations of the invention as hereinbefore set forth may be made without departing from the spirit and scope thereof and therefore only such limitations should be imposed as are indicated in the appended claims.

I claim as my invention:

1. The process of cracking hydrocarbons boiling above the gasoline range to produce gasoline which comprises contacting such hydrocarbons under catalytic cracking conditions with a catalytic contact mass in which the sole active catalytic ingredient present therein consists of precipitated and calcined beryllium oxide, and separating gasoline from the cracked products.

2. The process which comprises cracking a gas oil at a temperature in the range of 750° to 1100° F. at a liquid space rate of 0.5 to 8 volumes of oil per volume of catalyst per hour in contact with a catalytic mass in which the sole active catalytic ingredient present therein consists of precipitated and calcined beryllium oxide, and periodically regenerating the catalyst by burning of the carbonaceous deposit formed thereon in the cracking operation.

3. The process of cracking a petroleum charge stock containing hydrocarbons boiling above the temperature at which the cracking operation is operated which comprises adding steam to such a charge stock to assist in vaporization of high boiling hydrocarbons therein without exceeding the cracking temperature hereinafter defined and contacting said charge stock in the presence of the added steam with a steam stable catalyst in which the sole active catalytic ingredient present consists of precipitated and calcined beryllium oxide, at a temperature in the range of 800–900° F.

4. The process in accordance with claim 3 wherein said catalyst is one which has been steam treated at temperatures above 800° F.

GEORGE ALEXANDER MILLS.

REFERENCES CITED

The following references are of record in the file of this patent:

UNITED STATES PATENTS

| Number | Name | Date |
|---|---|---|
| 1,732,381 | Schmidt et al. | Oct. 22, 1929 |
| 2,274,988 | Matuszak | Mar. 3, 1942 |
| 2,289,757 | Connolly | July 14, 1942 |
| 2,309,137 | Peterkin | Jan. 26, 1943 |